US 6,602,976 B2

(12) United States Patent
Smith et al.

(10) Patent No.: US 6,602,976 B2
(45) Date of Patent: Aug. 5, 2003

(54) POLYCARBONATE OLIGOMERS AND POLYMERS FOR USE IN ELECTROLYTES

(75) Inventors: W. Novis Smith, Philadelphia, PA (US); Joel McCloskey, Philadelphia, PA (US)

(73) Assignee: Lithdyne International, Anaheim, CA (US)

( * ) Notice: Subject to any disclaimer, the term of this patent is extended or adjusted under 35 U.S.C. 154(b) by 218 days.

(21) Appl. No.: 09/849,117

(22) Filed: May 5, 2001

(65) Prior Publication Data

US 2002/0168575 A1 Nov. 14, 2002

(51) Int. Cl.[7] .................................................. C08G 75/18
(52) U.S. Cl. ...................... 528/391; 528/332; 528/422; 528/423; 528/424; 428/402; 429/129; 429/192; 429/304; 429/317
(58) Field of Search ................................. 528/332, 422, 528/391, 423, 424; 428/402; 429/129, 304, 192, 317

(56) References Cited

U.S. PATENT DOCUMENTS 5,422,423 A * 6/1995 Shacklette et al. .......... 528/422
6,475,663 B1 * 11/2002 Mohwald et al. ........... 429/129

* cited by examiner

*Primary Examiner*—Terressa M. Boykin
(74) *Attorney, Agent, or Firm*—John Lezdey

(57) ABSTRACT

There is provided novel polycarbonate polymers and oligomers for use as electrolytes in electrochemical devices having a higher content of organic carbonates so as to enhance electrical conductivity. The polymers are prepared by a condensation reaction or by ester exchange.

14 Claims, No Drawings

POLYCARBONATE OLIGOMERS AND POLYMERS FOR USE IN ELECTROLYTES

FIELD OF THE INVENTION

The present invention relates to gel or polymer electrolytes containing a poly or oligo carbonate group as a main component, which is formed by condensation and/or ion exchange reactions, which can be used in electrochemical devices such as a battery, a capacitor, and a sensor.

BACKGROUND OF THE INVENTION

With the recent increasing demand for reduction in size and weight of electronic equipment, electrochemical devices have been attracting attention. Electrochemical devices are composed of a variety of constituent materials, and improvement is shown in the respective constituent materials. Of those constituent materials, an electrolyte solution is one of the main materials making up lithium batteries. The electrolyte solution generally comprises an organic solvent, such as propylene carbonate or ethylene carbonate in combination with other solvents, and an ionic salt, such as lithium hexafluorophosphate, as a solute, while it depends on matching with positive and negative electrodes. Use of such an electrolytic solution, however, involves many problems in, for example, leakage of liquid, safety, and the like. A polymer having dispersed therein a compound whose ions are easily movable or transportable, and a polyelectrolyte layer comprising a cross-linked polymer comprising polyethylene oxide as a main component, have been proposed However, their performance is insufficient as yet in terms of flexibility at low temperatures or stability. Thus, a satisfactory polymer electrolyte is not yet obtained. It has therefore been demanded to develop an effective polyelectrolyte that overcomes the above problems and will contribute to further advancement of technology while still having the properties of a gel or solid electrolyte.

The one main disadvantage of the lithium and lithium-ion polymer electrolyte battery is that since the gel or polymer electrolyte is very viscous or essentially a solid with liquid channels, the conductivity and internal resistance (or impedance) are reduced by a factor of 10 to 1000 times compared to lithium batteries with a liquid electrolyte. The conductivities for liquid lithium battery electrolytes for rechargeable lithium-ion batteries are usually in the 3 to 12 mS range at room temperature. On the other hand, the conductivities for true lithium in polymer or gel electrolytes range from 0.01 to 0.6 mS. Although several recent patents have claimed improvements up to about 1 mS. Both the rate of discharge and rate of charge are dependent on the conductivity and also low temperature performance is more negatively effected by the lower conductivities in the polymer electrolytes.

It is known that the best solvents for rechargeable lithium-ion battery performance are based on mixtures of ethylene carbonate (m.p. 35° C.) with other lower molecular weight dialkyl carbonates, which lower the liquidus range of the ethylene carbonate, such as dimethyl carbonate, diethyl carbonate, ethyl methyl carbonate, etc. Solutions of lithium salts such as the hexafluorophosphate, perchlorate, triflate, tetrafluoroborate, bis(trifluoromethylsulfonyl) imide, etc. at about one molar concentrations give conductivities in the range of 3 to 12 mS at room temperature.

In order to maximize the conductivity of the polymer electrolyte, the solvation of the lithium cation must be maximized, and therefore the amount of organic carbonate structure in the gel or polymer must be maximized according to the present invention there is provided.

U.S. Pat. No. 6,180,287 to Watanabe et al., which is herein incorporated by reference, discloses a solid polymer electrolyte by a polyether copolymer having a main chain derived from ethylene oxide and a side chain having two oligo-oxethylene groups and an electrolyte salt.

U.S. Pat. No. 6,190,805 to Takeuchi et al., which is herein incorporated by reference, discloses an ion conductive solid polymer electrolyte using a composite material derived from a (meth) acrylate prepolymer having a urethane bond and containing an oxyalkylene group, and an electrolyte salt.

JP-A4-253771 proposes to use a polyphosphazene-base polymer compound as an ion conductive material of a battery or electric double layer capacitor. The battery or electric double layer capacitor using a solid ion conductive material mainly comprising such a polymer compound is advantageous in that the output voltage is high as compared with those using an inorganic ion conductive material and it can be formed into various shapes and easily sealed. However, in this case, the ion conductivity of the solid polymer electrolyte is not sufficiently high and it is approximately from $10^{-4}$ to $10^{-6}$ S/cm, as a result, the takeout current is disadvantageously small. Furthermore, in assembling a solid electrolyte together with polarizable electrodes in a capacitor, it is difficult to uniformly compound the solid electrolyte with the carbon material having a large specific area because the materials mixed are both a solid.

J. Phys. Chem., Vol. 89, page 987 (1984) describes an example where oligoxyethylene is added to the side chain of polymethacrylic acid and an alkali metal salt is compounded thereto. Further, J. Am. Chem. Soc., Vol. 106, page 6854 (1984) describes polyphosphazene having an oligooxyethylene side chain, compounded with an alkali metal salt, however, the ion conductivity is about 1I0O S/cm and still insufficient.

SUMMARY OF THE INVENTION

The present invention relates to gel or polymer electrolytes prepared by condensation or ester exchange reactions, which are useful in electrochemical devices.

More particularly there is provided a series of polymers and oligomers, which use carbonate groups as the backbone of the polymer having the structure:

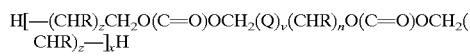

Where n is 1, 2, or 3, z is 0 to 6, R is hydrogen, methyl, ethyl, —CHR"O(C=O)O—M, where R" is hydrogen, methyl, ethyl, or bridging group; M is a cross linking bond to another part of the molecule, methyl, ethyl, or propyl group or a mix thereof, Q is —(CH2OCH2)—,

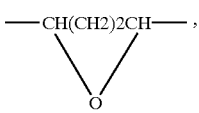

or —CH2NRCH2—, and V is 0, 1, 2 or 3.

A preferred polymer or oligomer of the invention has the following structure:

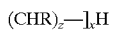

Wherein Z is 2, N is 2, or 3, and R is hydrogen, methyl, ethyl, —CHR"O(C=O)O—M, where R" is hydrogen, methyl, ethyl or bridging group; and M is a cross linking bond to another part of the molecule or a methyl or propyl or a mix of these groups.

It is general object of the invention to provide novel polymers and oligomers that can be useful for electrolytes in electrochemical devices.

It is another object of the invention to provide polymers that can be blended with high boiling organic carbonates to form gels.

It is a further object of the invention to provide electrolytes having high conductivity.

It is yet another object of the invention to provide a process for preparing polymers and oligomers for use in preparing high conductive electrolytes.

DESCRIPTION OF THE PREFERRED EMBODIMENTS

According to the present invention there is provided a series of polymers and oligomers, which actually use the carbonate group as the backbone of the polymer and the actual condensing group rather an activated double bond in a special monomer. Accordingly, one is able to maximize the actual organic carbonate content of the polymer and maximize the conductivity of the polymer electrolyte.

Furthermore, it has been found that conductivities of about 0.5 to 2 mS can be obtained with lithium salts in these polymers and polymer gels formed by the condensation and/or polymerization of organic carbonates to form higher molecular weight molecules that maximize the primary organic carbonate content in the oligomer or polymer structure.

These polymers are formed by condensation and/or ester exchange reactions.

There is a continuum of these subject oligomers and polymers with respect to structure and physical properties. These polymers and oligomers exhibit enhanced conductivity over currently available polyethylene oxide (PEO) structures and hybrid polymer systems which although incorporating some organic carbonate structure do not maximize the —O(C=O)O—]— content of the polymer, In addition these subject polymers can also be blended with high boiling organic carbonates such as ethylene carbonate, propylene carbonate, (b.p.>240° C.) to form gels. These are high boiling solvents that maximize the conductivity.

The general structure of these oligomers and polymers are:

H[—(CHR)$_z$CH$_2$O(C=O)OCH$_2$(Q)$_v$(CHR)$_n$O(C=O)OCH$_2$(CHR)$_z$—]$_x$H

Where n is 1, 2, or 3; z is 0 to 6, R is hydrogen, methyl, ethyl, —CHR"O(C=O)O—M, where R" is hydrogen, methyl, ethyl or bridging group; M is a cross linking bond to another part of the molecule, methyl, ethyl, or propyl group or a mix thereof, Q is —(CH2OCH2)—,

or —CH2NRCH2—, and V is 0, 1, 2, or 3.

Preferred polymers and oligomers of the invention having the following structure:

H[—(CHR)$_z$CH$_2$O(C=O)OCH$_2$(CHR)$_n$O(C=O)OCH$_2$(CHR)$_z$—]$_x$H

Wherein Z is β, N is 2, or 3, and R is hydrogen, methyl, ethyl, —CHR"O(C=O)O—M, where R" is hydrogen, methyl, ethyl or bridging group; and M is a cross linking bond to another part of the molecule or a methyl or propyl or a mix of these groups.

The polymers and oligomers of the present invention are prepared by a condensation method or by ester exchange in order to maximize the available carbonate content that enhance the conductivity.

The polymers and oligomers of the invention can be made in various ways.

A. One method involves the following reaction mechanism wherein Ft is ethyl:

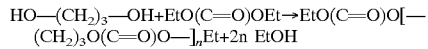

HO—(CH$_2$)$_3$—OH+EtO(C=O)OEt→EtO(C=O)O[—(CH$_2$)$_3$O(C=O)O—]$_n$Et+2n EtOH

In general, these polymers can be made using diols that contain at least three atoms usually carbon atoms between the hydroxyl groups. In the case of two carbon atoms between the carbonate groups the system will tend to form a very stable five-member ring such as in ethylene carbonate or propylene carbonate and the polymer will not readily form or is not stable when heated.

HO—(CH$_2$)$_2$—OH+EtO(C=O)OEt→Ethylene carbonate+2EtOH

A general chemical description of these polymers formed from the diols is:

H[—(CHR)$_z$CH$_2$O(C=O)OCH$_2$(CHR)$_n$O(C=O)OCH$_2$(CHR)$_z$—]$_x$H

Where n is 1, 2 or 3, z is 0 to 6, and R is hydrogen, methyl, ethyl, —CHR"O(C=O)O—M, where R" is hydrogen, methyl, ethyl or bridging group; M is a cross linking bond to another part of the molecule or a methyl, ethyl, or propyl or a mix of these groups.

Also the following chemical description applies when diols are used:

H[—(CHR)$_z$CH$_2$O(C=O)OCH$_2$(Q)$_v$(CHR)$_n$O(C=O)OCH$_2$(CHR)$_z$—]$_x$H

Where n is 1, 2, or 3, z is 0 to 6, and R is hydrogen, methyl, ethyl —CHR"O(C=O)O—M, where R" is hydrogen, methyl, ethyl or bridging group; M is a cross linking bond to another part of the molecule or a methyl, ethyl, or propyl or a mix of these groups, Q is —(CH$_2$OCH$_2$)—,

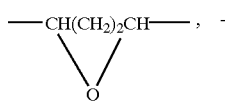

CH$_2$NRCH$_2$—, and V is 0, 1, 2, or 3.

B. An alternative route to these polymers using, diols is:

The basic "monomer" is made by reacting chloromethyl carbonate with the appropriate diol and then the resulting "dicarbonate" is heated to drive off the dimethyl carbonate resulting in a polymer.

The reaction is as follows:

2 CH$_3$O(C=O)Cl+HOCH$_2$CH$_2$OCH$_2$CH$_2$OH+Pyridine→2 H Cl. Pyridine+CH$_3$O(C=O)OCH$_2$CH$_2$OCH$_2$CH$_2$O(C=O)OCH$_3$→CH$_3$O(C=O)O[—CH$_2$CH$_2$OCH$_2$CH$_2$O(C=O)O—]$_x$CH$_3$ +x−1 CH$_3$O(C=O)OCH$_3$ X=1 and higher Any chloroalkyl carbonate or even phosgene may be used.

C. According to another method:

Polyols or polyhydric molecules containing more than two hydroxyl groups can be used to react with dialkyl carbonate or even ethylene or propylene carbonate to form oligomers and polymers containing a maximum amount of organic carbonate groups. In addition, this permits the formation of some five-membered rings such as pendant ethylene or propylene carbonate groups to be present on the polymer chain along with a certain degree of cross linking.

The reaction mechanism is as follows:

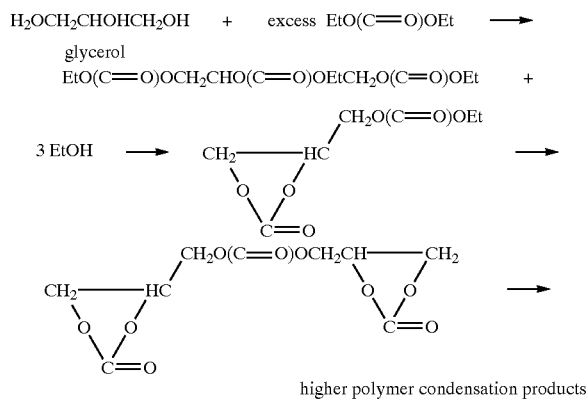

For example:

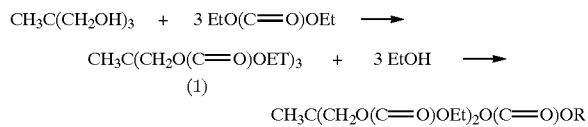

Where R is a cross link to another (1)
→higher condensation products
D. A still further method involves the use of cyclic carbonate such as ethylene carbonate and triol
The reaction is as follows:

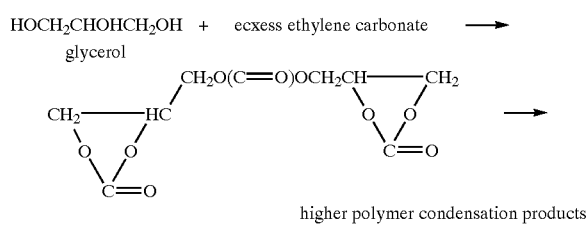

Polyols such as glycerol, trimethylol propane, sorbitol, etc. are very high boiling even under vacuum and the equilibrium is shifted to favor reaction with these higher boiling polyols and the ethylene glycol slowly distills off forming the desired condensation polymers. These polymers can best chemically described in general as:

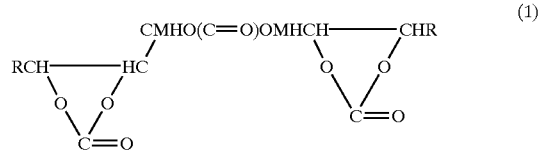

Where R and M are CHR'O(C=O)O—R"; CHR'O(C=O) O—R' where R' and R" are alkyl groups of one to four carbons or a cross link to another molecule similar to (1)

E. Yet another method involves the reaction of triols (and polyols) and chloroalkyl carbonate:

Lower molecular weight oligomers and intermediates may be formed by reacting a polyol with a chloroalkyl carbonate according to the following reaction:

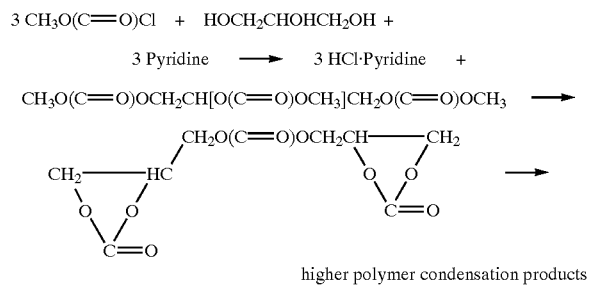

Any chloroalkyl carbonate or even phosgene may be used.

F. A still further method involves the reaction of epoxide containing compounds with alkyl carbonates:

The oligomers and polymers containing high percentages of organic carbonate groups are formed by the reaction of epoxides such as glycidol with dialkyl and diaryl carbonates as follows wherein Et is ethyl:

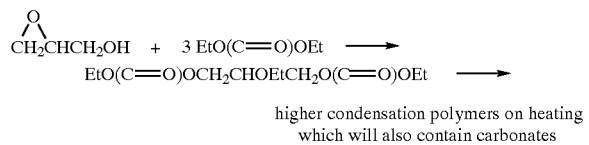

The epoxides used should have at least one other reactive functional group, which can include another epoxide, a hydroxyl, or an organic carbonate.

The general form of these products are:

RO(C=O)OCH$_2$CHORM

Where R is an alkyl group from 1 to 4 carbons and M is a group containing at least one CH$_2$O(C=O)OR and may contain up to eight carbon atoms; R and M may be bridging groups.

In the reactions described for forming the oligomers and polymers, all volatiles were removed under vacuum with heating depending on the amount of condensation desired. In some cases the reaction was quenched by adding about 1% alkoxy triethyl silane to cap any free hydroxy groups and kill the catalyst if one is present. The polymers could be further purified by dissolving in methylene chloride, filtering, and then drying under heat and vacuum.

The polymers of the invention could be infused with electrolyte salt by mixing in a solution of the desired lithium salt (dissolved in ether, dimethyl carbonate or acetonitrile) in the desired amount and pulling off the volatile solvent with vacuum while warming. Such polymers were evaluated by infusing each at about 1 M LiPF$_6$ and/or LiClO$_4$ and checking the conductivity at RT, −20° and 50°. In addition with the gel and polymers, the polymers can be blended with about 10 to 60% by weight ethylene carbonate or propylene carbonate or related high boiling cyclic carbonates to further enhance conductivity by forming lower viscosity gels. The conductivities of these various viscous liquids and gels range from 0.1 to 2 mS/cm.

These new polymers, oligomers, and blends with cyclic carbonates and other aprotic higher boiling solvents when containing an appropriate lithium salt are useful as the electrolyte in lithium-ion and lithium batteries. The use of quaternary ammonium salts such as tetraethylammonium tetrafluoroborate dissolved in these polymers and oligomers are useful in double layer capacitors (super capacitors). Other applications include conductivite polymeric films for sensors for detecting various phenomena such as humidity, chemical vapors, etc.

EXAMPLE 1

250 g of diethyl carbonate was added to 200 g 1,3-propanediol under argon and then 2 ml of 1 lithium methoxide in methanol was added. The mixture was heated at 130° C. until all volatiles had distilled over including the ethanol and excess diethyl carbonate. The polymer was cooled and quenched with 3 ml of triethylethoxy silane to neutralize the catalyst. The resulting polymer was vacuum dried at 40° C. for 4 hours. (The reaction is slower without catalyst. Lithium carbonate may also be used as a catalyst and the polymer dissolved in methylene carbonate and filtered to remove the catalyst. The 0.5 ml of triethylethoxy silane is added and the solvent and volatiles removed).

EXAMPLE 2

A gel was made by combining 33% ethylene carbonate and 67% of the trimethylene carbonate polymer (from example 1) by weight. A solution of 10 g $LiClO_4$ in dimethyl carbonate was added to 90 g of the gel and the dimethyl carbonate removed under vacuum at 30° C. The resulting gel was 1 M $LiClO_4$ in concentration. The conductivity at 25° C. was 1 mS/cm.

The structures of these polymers which is based on the organic carbonate structure [RO(C=O)OR'] maximizes the salvation and interaction of the polymer with respect to the lithium salt thereby increases the achievable conductivity of the lithium salt loaded polymer. This conductivity is greater than that achievable with a comparable PEO polymer, which is the current technology. These organic carbonate polymers were made into three different forms: 1) polymeric thick liquid, 2) gel, and 3) a firmer solid with the conductivity higher in the polymeric liquid than in the gel and higher in the gel higher than the solid.

EXAMPLE 3

60 g. of a 20% by weight solution of $LiPF_6$ in dimethyl carbonate was mixed with 80 g. of the polymer of example 1 under inert atmosphere. The thick solution was coated on to sheet of aluminum and the solvent removed using vacuum and heat. The thin film of polymer containing 15% $LiPF_6$ had a conductivity of 0.9 mS.

EXAMPLE 4

60 g. of a 20% by weight solution of $LiPF_6$ in dimethyl carbonate/ethylene carbonate (1:1) was mixed with 60 g. of the polymer of example 1 under inert atmosphere. The thick solution was coated on to sheet of aluminum and the solvent removed using vacuum and heat. The thin gel film containing 33% ethylene carbonate had a conductivity of 1.2 mS.

What is claimed is
1. Polymer and oligomer having the following structure:

H[—(CHR)$_z$CH$_2$O(C=O)OCH$_2$(Q)$_v$(CHR)$_n$O(C=O)OCH$_2$(CHR)$_z$—]$_x$H

Wherein n is 1, 2, or 3; z is 0 to 6, R is hydrogen, methyl, ethyl, —CHR"O(C=O)O—M where R" is a hydrogen, methyl, ethyl or bridging group; M is a crosslinking bond to another part of the molecule, methyl, ethyl, or propyl group or a mix thereof, Q is —(CH2OCH2)—,

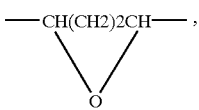

or —CH2NRCH2—; V is 0, 1, 2, or 3 and x≧1.

2. A polymer or oligomer of claim 1 having the structure:

H[—(CHR)$_z$CH$_2$O(C=O)OCH$_2$(CHR)$_n$O(C=O)OCH$_2$(CHR)$_z$—]$_x$H

Wherein Z is 2, N is 2, or 3, and R is hydrogen, methyl, ethyl, —CHR"O(C=O)O—M, where R" is a hydrogen, methyl, ethyl or bringing group; M is a crosslinking bond to another part of the molecule or a methyl or propyl or a mix of these groups; and x≧1.

3. A polymer or oligomer of claim 1, which has the structure:

CH$_3$O(C=O)O[—CH$_2$CH$_2$OCH$_2$CH$_2$O(C=O)O—]$_x$CH$_3$ wherein x≧1.

4. A polymer or oligomers of claim 1 having the structure:

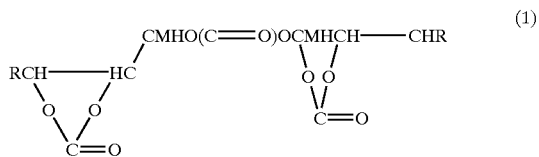

(1)

Wherein R and M are CHR'O(C=O)O—R" or CHR'O(C=O)O—R' wherein R', and R" are alkyl groups of one to four carbons or a cross link to another molecule of formula (1).

5. A polymer or oligomer of claim 1 having the structure:

CH$_3$O(C=O)O[—CH$_2$CH$_2$OCH$_2$CH$_2$O(C=O)O—]$_x$CH$_3$

Wherein X is 1 or 2.

6. A polymer or oligomer of claim 1 having the structure:

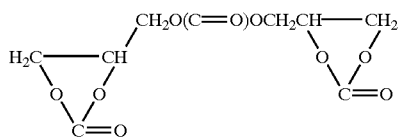

7. A conductive composition comprising a polymer or oligomer of claim 1 and lithium salts.

8. The composition of claim 7, which is an electrolyte.

9. The composition of claim 8, which is a battery electrolyte.

10. A composition comprising a polymer or oligomer of claim 1 and a quaternary ammonium salt.

11. The composition of claim 9, which is a capacitor eletrolyte.

12. A process for preparing a polymer according to claim 1 comprising the reaction a chloroalkyl carbonate and a polyol having at least four carbon atoms.

13. A process for preparing a polymer according to claim 1 comprising reacting diethyl carbonate and 1,3-propanediol in an inert atmosphere.

14. A process for preparing a polymer according to claim 1, which comprises reacting ethylene carbonate and trimethylene carbonate and then adding a solution of $LiClO_4$ to the resulting product to form a gel.

* * * * *